United States Patent
Finkelstein

(10) Patent No.: US 11,026,403 B1
(45) Date of Patent: Jun. 8, 2021

(54) FLAVOR PLATE FOR PET FOOD BOWL

(71) Applicant: Steven Finkelstein, Greenwich, CT (US)

(72) Inventor: Steven Finkelstein, Greenwich, CT (US)

( * ) Notice: Subject to any disclaimer, the term of this patent is extended or adjusted under 35 U.S.C. 154(b) by 168 days.

(21) Appl. No.: 16/553,583

(22) Filed: Aug. 28, 2019

Related U.S. Application Data

(60) Provisional application No. 62/723,640, filed on Aug. 28, 2018.

(51) Int. Cl.
| | |
|---|---|
| A01K 5/01 | (2006.01) |
| A01K 15/02 | (2006.01) |
| A23K 20/174 | (2016.01) |
| A23K 10/00 | (2016.01) |

(52) U.S. Cl.
CPC .......... *A01K 15/025* (2013.01); *A01K 5/0114* (2013.01); *A23K 10/00* (2016.05); *A23K 20/174* (2016.05)

(58) Field of Classification Search
CPC .... A01K 15/025; A01K 5/0114; A01K 15/02; A01K 5/0128; A01K 5/01
See application file for complete search history.

(56) References Cited

U.S. PATENT DOCUMENTS

| | | | |
|---|---|---|---|
| 5,346,710 A | 9/1994 | Geitner | |
| 5,377,621 A * | 1/1995 | Camm | A01K 5/0114 119/61.54 |
| 5,592,899 A * | 1/1997 | English | A01K 5/0114 119/174 |
| 6,167,841 B1 * | 1/2001 | Ho | A01K 15/025 119/61.54 |
| 6,314,911 B1 | 11/2001 | Kaytovich | |
| 7,856,944 B1 | 12/2010 | Stauffer | |
| 8,342,128 B2 * | 1/2013 | Rocker | A01K 5/0128 119/61.2 |
| 9,241,777 B2 | 1/2016 | Ressemann et al. | |

(Continued)

FOREIGN PATENT DOCUMENTS

KR 2015172809 6/2017

OTHER PUBLICATIONS

Anonymous, Lick Lick Pad, petcurve.com.

*Primary Examiner* — Trinh T Nguyen
(74) *Attorney, Agent, or Firm* — Werschulz Patent Law, LLC; Patricia P. Werschulz, Esq.

(57) ABSTRACT

A pet entertainment device comprises a plurality of textured plates that are imbued with a flavored coating which may be selectively fastened on to a bottom of a pet food bowl. The plates are impregnated with a slow dispensing flavor that is attractive to pets. The slow dispensing flavor can be replenished as needed. The textured plates are of various sizes and shapes. The device is designed in a manner that allows for the plates to be removed and discarded by a person but not easily removed by an animal. Alternatively, the plates can be built directly on to the bottom of a pet food bowl. In one embodiment, the plates are edible. Another embodiment of the device is to facilitate dosing a recalcitrant pet by imbuing the textured plate with a combination of flavoring and beneficial substances. The device facilitates a method of easy replenishment of a flavored region of the pet entertainment device to ensure that the device maintains optimal flavoring.

12 Claims, 4 Drawing Sheets

(56) References Cited

U.S. PATENT DOCUMENTS

| | | |
|---|---|---|
| 9,545,081 B2 | 1/2017 | Nolan |
| 10,791,710 B1 * | 10/2020 | White .................. A01K 5/0114 |
| 2007/0234965 A1 | 10/2007 | Aguilar et al. |
| 2009/0044755 A1 | 2/2009 | Volotzky |
| 2013/0104808 A1 * | 5/2013 | Rocker ................ A01K 5/0128 |
| | | 119/61.55 |
| 2015/0114301 A1 * | 4/2015 | Nolan .................. A01K 5/0114 |
| | | 119/61.5 |
| 2015/0157043 A1 | 6/2015 | Martin |
| 2017/0127647 A1 | 5/2017 | Owens, I |
| 2020/0077621 A1 * | 3/2020 | Houx .................. A01K 5/0114 |

* cited by examiner

FLAVOR PLATE FOR PET FOOD BOWL

CROSS-REFERENCE TO RELATED APPLICATIONS

This application is a nonprovisional utility application of the provisional patent application, Ser. No. 62/723,640, filed in the United States Patent Office on Aug. 28, 2019, and claims the priority thereof and is expressly incorporated herein by reference in its entirety.

TECHNICAL FIELD

The present disclosure relates generally to a pet entertainment device. More particularly, the present disclosure relates to a flavored plate for a pet food bowl.

BACKGROUND

Millions of American families own pets. Unfortunately, many pet owners spend a significant portion of their lives away from home and their pets. As a result, many pets that are kept indoors are left without companionship or adequate stimulation. Without their owners, these pets become bored and may develop destructive behavior. The destructive behaviors, such as damaging various surfaces and objects throughout the home, may be a coping mechanism for their boredom and/or frustration.

Pet toys and other entertainment devices are sometimes marketed as a means to occupy the pets' attention while their owners are away from home. Various toys and devices distract the pets from their despair with sounds, tactile feedback, and flavors.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspect is disclaimed and it is contemplated that the claims may encompass one or more of the conventional technical aspects discussed herein.

BRIEF SUMMARY

An aspect of an example embodiment in the present disclosure is to provide oral stimulation to domesticated pets. Accordingly, an aspect of an example embodiment in the present disclosure provides a convenient form that allows pet owners to regularly and easily replace the flavored portion of a pet entertainment device. Regular replacement of the plates results in the pet not losing interest in the pet entertainment device by maintaining optimal flavoring.

A further aspect of an example embodiment in the present disclosure is to provide an edible oral stimulation. Accordingly, an aspect of an example embodiment in the present disclosure provides an edible plate that selectively and securely inserts into a feeding bowl allowing pet owners to regularly and easily replace the edible plate but making it not easily removed by the pet.

Another aspect of an example embodiment in the present disclosure is to facilitate ingestion of medications, vitamin supplements, and other beneficial agents that a recalcitrant pet would normally refuse. Accordingly, the present disclosure provides that combining the beneficial agents with the flavoring would distract a recalcitrant pet from the beneficial agents with flavoring, resulting in the ingestion of the beneficial agents.

Accordingly, this disclosure solves the issue of pets becoming bored with ordinary pet entertainment devices, which may result in subsequent damage to other objects within the home.

The present disclosure describes a plurality of flat plates of various sizes and/or shapes that are placed on a bottom of a pet food bowl. The plates are selectively fastened on the bottom of a pet food bowl in a manner that allows the plates to be removed and discarded by a person but not easily removed by an animal. Alternatively, the plates can be built directly on the bottom of a pet food bowl. The plates are impregnated with a slow dispensing flavor that is attractive to pets in order to capture their attention for prolonged periods. In one embodiment, the plates are edible. The slow dispensing flavor can be replenished as needed.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 2:
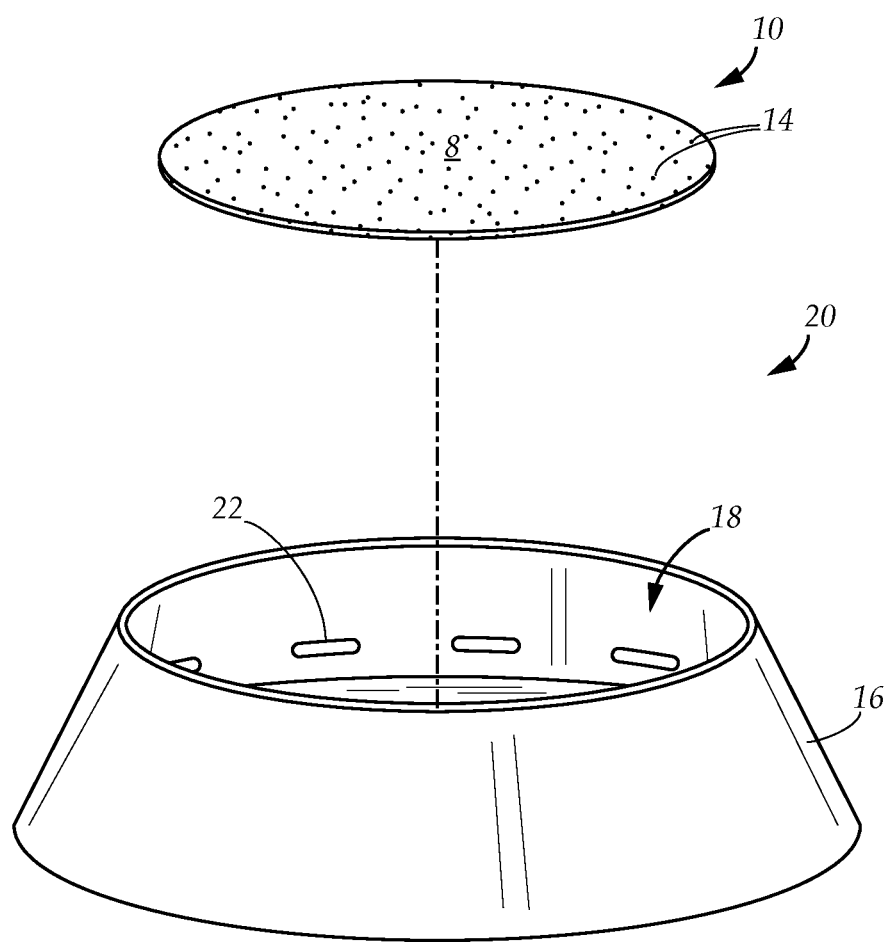
FIG. 2 is a perspective view of an example embodiment of the pet entertainment device.

FIG. 2 illustrates an example embodiment of a pet entertainment device 20. The pet entertainment device 20 comprises a plate 10 having a surface coating 8. The surface coating 8 comprises a flavor element that is pleasing to a pet. The flavor element is selected from peanut butter, cheese, beef, chicken, pork, fish, catnip or another pet-attracting flavor. In one example embodiment, the plate 10 is edible.

The plate 10 provides challenges and opportunities for the pet to lick and chew, keeping the pet busy and free from boredom. In the example embodiment of the edible plate 10, chewing continuously for a period of time also tires and relaxes the pet.

In a further example embodiment, medications, vitamin supplements or other beneficial agents can be added to the flavor element in order to properly dose a recalcitrant pet.

In the drawing, the surface coating further comprises a plurality of particles 14. The particles 14 provide stimulus to the pet's tongue. In one example embodiment, the particles are small such as micro- or nano-particles that contain the flavor element encapsulated with a dissolvable film.

The plate 10 sits in a cavity 18 of a pet food bowl 16. In one example embodiment, the pet food bowl 16 has a plurality of slots 22 for selectively securing the plate 10. Other means of selectively securing the plate 10 are envisioned within the inventive concept.

A method of entertaining a pet includes providing a pet entertainment device to the pet by providing a plate 10 having a surface coating 8 that comprises a flavor element, securing the plate 10 inside the cavity of a pet food bowl 16 by snapping the plate into the slots, and removing the plate 10 from the pet food bowl 16 when the pet is no longer interested. The plate 10 is discarded and replaced with a new plate 10 or alternatively, the plate receives a new surface coating of the flavor element.

In another example embodiment, the plate 10 is held in place by an edible adhesive on one side that is placed downwardly into the pet food bowl 16. I yet another example embodiment, the plate 10 has sufficient flexibility such that it snap fits into the pet food bowl 16 and is held there by spring tension. Other means of securing the plate 10 in the pet food bowl 16 to prevent the pet from rapidly removing the plate 10 are envisioned within the inventive concept. All means of securing the plate 10 in the pet food bowl 16 and removing the plate 10 are easily achieved by a person, but very difficult and challenging for the pet to perform.

A further method of entertaining the pet includes providing a pet entertainment device to the pet by providing a plate 10 made from edible material, having a flavor element, securing the plate 10 inside the cavity of a pet food bowl 16 by snapping the plate into the slots, securing by an edible adhesive and removing the plate 10 from the pet food bowl 16 when the pet is no longer interested. The plate 10 is replaced with a new plate 10 made from edible material.

The pet is attracted to the pet entertainment device 20 by the odor of the flavor element in the coating or in some instances in the particles 14. The pet begins licking the plate 10 slowly releasing the flavor element and the pet's taste buds in the tongue are stimulated. The pet instinctively associated licking the plate with the pleasant taste and continues to lick.

Licking the plate 10 provides oral stimulation without providing food, preventing the pet from overeating from boredom.

In other example embodiment, the plate 10 is edible, formed from edible material such as natural materials that requires significant chewing. The plate 10 is treated with a very tasty flavor attractive to the pet.

Figure 3A:
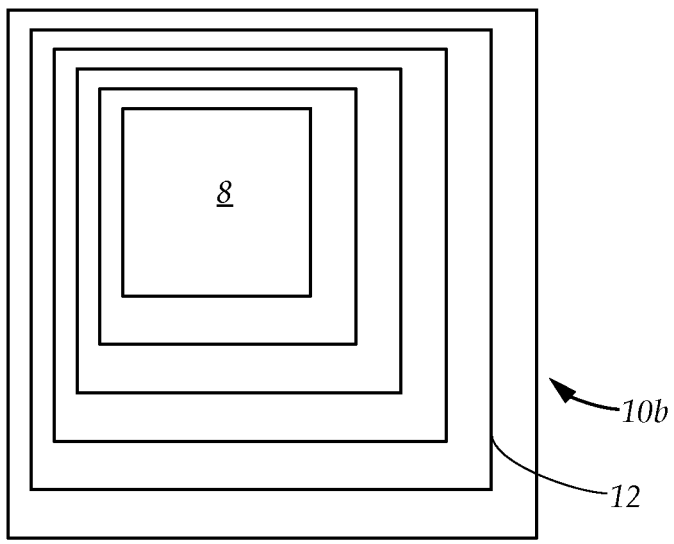
FIG. 3A is a top plan view of a further example embodiment of the flat plate in the pet entertainment device.
Figure 3B:
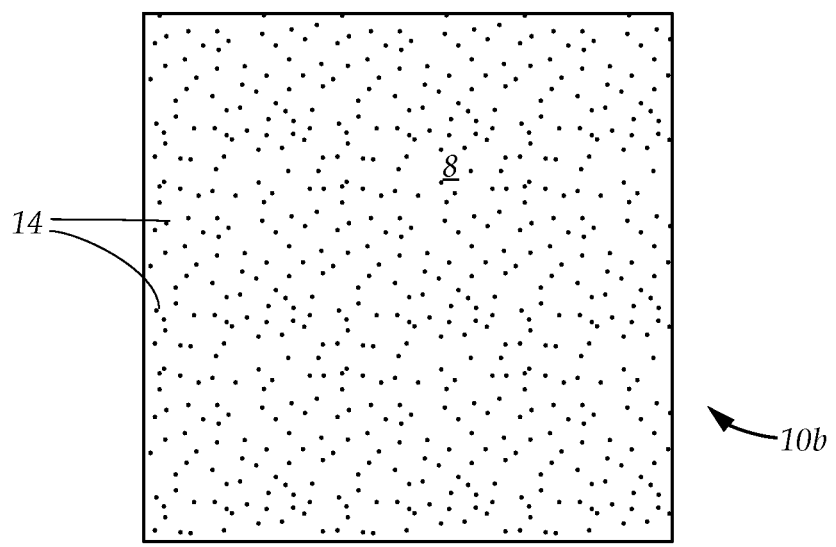
FIG. 3B is a top plan view of yet a further example embodiment of the flat plate in the pet entertainment device.
Figure 4:
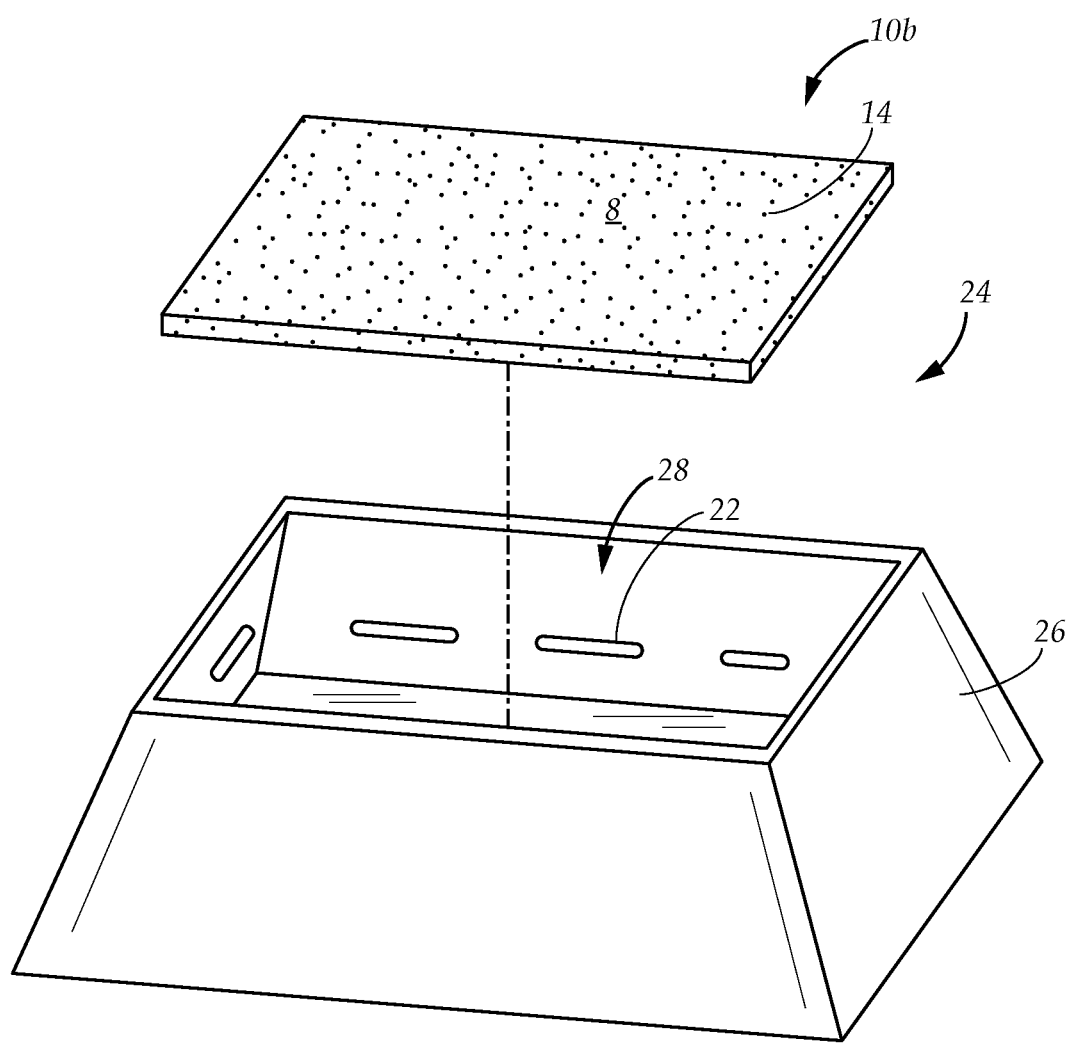
FIG. 4 is a perspective view of another example embodiment of the pet entertainment device.

FIG. 4 is similar to FIG. 3. The plate 10b is rectangular and covered with a with a surface coating 8 as described hereinabove. Similarly, the plate is selectively secured in the slots 22 inside a cavity 28 of a rectangular pet food bowl 26. The shape of the plate 10b conforms to the perimeter of the cavity 28. As one of ordinary skill in the art realizes, pet food bowls are provided in a wide variety of shapes and sizes and the shape and size of the plates 10 described in these embodiments.

Figure 1A:
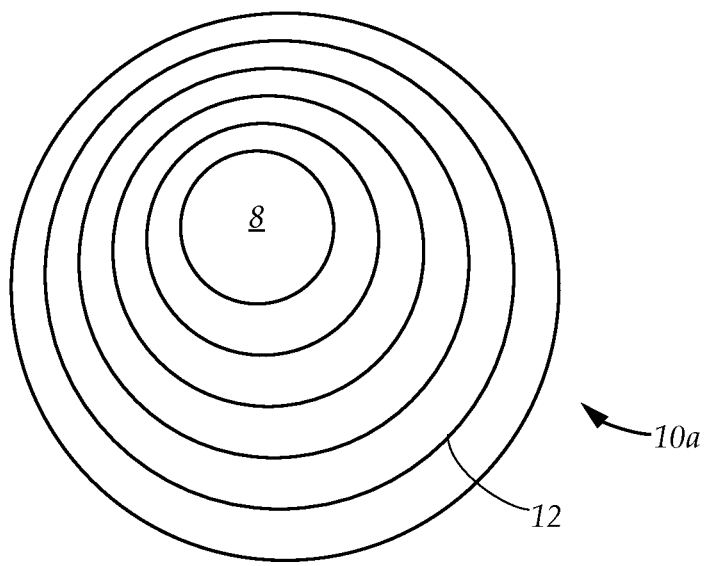
FIG. 1A is a top plan view of an example embodiment of a flat plate in a pet entertainment device.
Figure 1B:
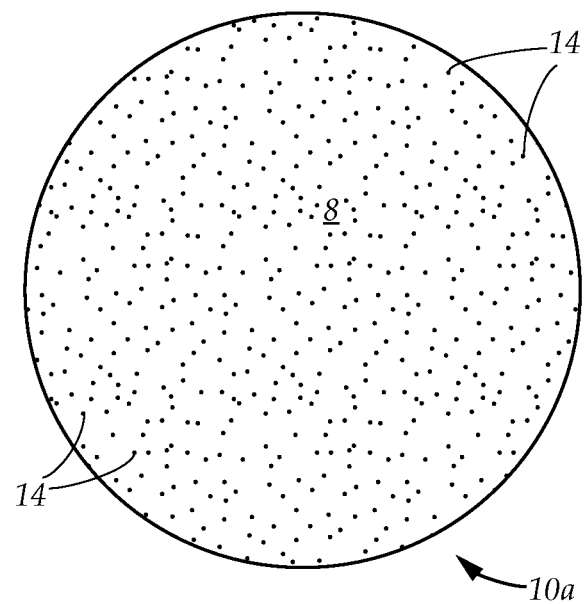
FIG. 1B is a top plan view of another example embodiment of the flat plate in the pet entertainment device.

FIGS. 1a, 1b, 3a and 3b show several example embodiments of the plate. FIGS. 1a and 1b demonstrate plates 10a with an annular shape. As shown, these plates 10a are circular, but other rounded shapes such as ovals are envisioned within the inventive concept. FIG. 1a shows the plate 10a having a plurality of grooves 12 or ridges that provides more surface area thereby increasing the amount of flavor element and making the plate 10a more interesting to the pet. As explained hereinabove, the surface coating with the flavor element covers the plate 10a. In the drawing of FIG. 1a, the plate 10a has a plurality of grooves 12 on the surface. The groves 12 provide stimulus to the pet's tongue. In one embodiment, the grooves 12 are concentric, but this is not a limitation.

FIG. 1b shows the plate 10a with the particles 14 as explained hereinabove.

FIGS. 3a and 3b show rectangular plates 10b, a square merely being a special case of a rectangle. FIG. 3a has the surface coating and grooves 12, similar to the grooves shown in FIG. 1a. FIG. 3b has the surface coating 8 with particles 14.

As shown in FIG. 2, in order to provide the pet entertainment device 20 that conforms to the cavity 28 of the pet food bowl 26, the pet entertainment device comprising the plate 10 with a surface coating 8 having a flavor element may be provided as a kit comprising at least one pet entertainment device 20 and the pet food bowl 26. The kit may also comprise a quantity of surface coating having the flavor element provided for refreshing the plate 10.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a pet entertainment device. The disclosure is illustrated by example in the drawing figures, and throughout the written description. It should be understood that numerous variations are possible, while adhering to the inventive concept. Such variations are contemplated as being a part of the present disclosure.

What is claimed is:

1. A pet entertainment device, comprising:
a thin flat plate configured to sit inside a pet food bowl;
a surface coating on the thin flat plate having a flavor element pleasing to a pet; and
a plurality of particles in the surface coating configured to stimulate a pet's tongue.

2. The pet entertainment device as described in claim 1, wherein the flat plate is chewable.

3. The pet entertainment device as described in claim 2, wherein the flat plate further comprises natural materials that can accommodate significant chewing.

4. The pet entertainment device as described in claim 1, wherein the flat plate is edible.

5. The pet entertainment device as described in claim 1, wherein the plurality of particles are micro-particles containing the flavor element encapsulated with a dissolvable film.

6. The pet entertainment device as described in claim 1, wherein the plurality of particles are nano-particles containing the flavor element encapsulated with a dissolvable film.

7. The pet entertainment device as described in claim 1, further comprising a plurality of slots in the pet food bowl, the flat plate inserting within the slots.

8. The pet entertainment device as described in claim 1, wherein the flat plate has an edible adhesive on one side configured for holding the flat plate in place in the pet food bowl.

9. The pet entertainment device as described in claim 1, wherein the flat plate snap-fits inside the pet food bowl and is held in place by tension.

10. The pet entertainment device as described in claim 1, wherein the flat plate further comprises the surface coating selected from the group consisting of medications, vitamins, nutritional supplements and beneficial agents.

11. The pet entertainment device as described in claim 1, wherein the surface coating further comprises an odor attractive to the pet.

12. The pet entertainment device as described in claim 1, wherein the flavor element pleasing to the pet is further released upon licking by the pet.

\* \* \* \* \*